Figure 1:
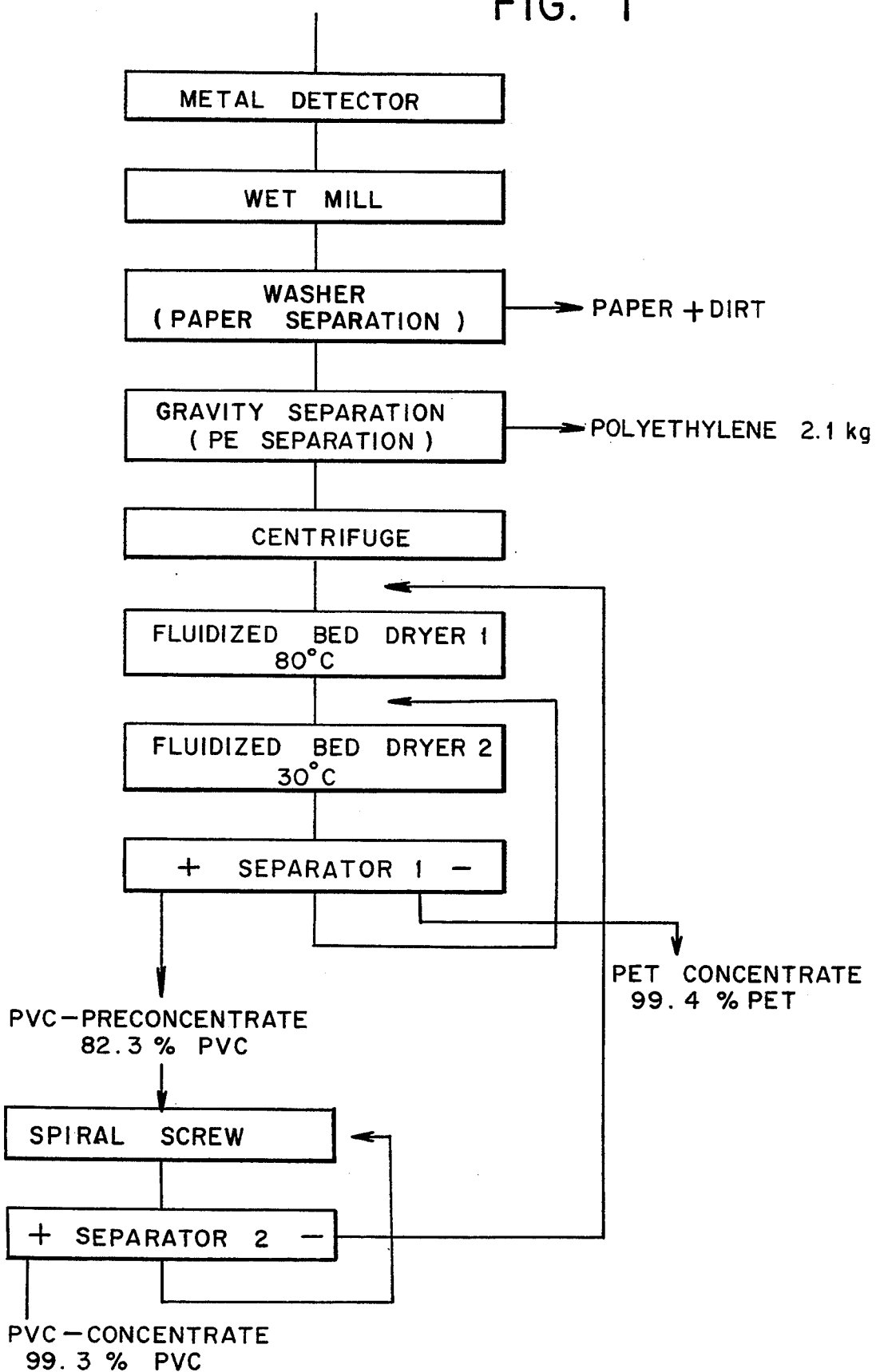

United States Patent
Stahl et al.

[11] Patent Number: 5,366,091
[45] Date of Patent: Nov. 22, 1994

[54] METHOD OF SEPARATING POLY(ETHYLENE TEREPHTHALATE) (PET) AND POLY(VINYL CHLORIDE) (PVC)

[75] Inventors: Ingo Stahl, Vellmar; Axel Hollstein, Kassel; Ulrich Kleine-Kleffmann; Iring Geisler, both of Bad Hersfeld; Ulrich Neitzel, Kassel, all of Germany

[73] Assignee: Kali und Salz Aktiengesellschaft, Kassel, Germany

[21] Appl. No.: 39,271

[22] PCT Filed: Jul. 4, 1992

[86] PCT No.: PCT/EP92/01514
    § 371 Date: Apr. 9, 1993
    § 102(e) Date: Apr. 9, 1993

[87] PCT Pub. No.: WO93/03851
    PCT Pub. Date: Mar. 4, 1993

[30] Foreign Application Priority Data
Aug. 21, 1991 [DE] Germany .............. 4127575

[51] Int. Cl.[5] ............................. B03C 7/00
[52] U.S. Cl. ........................ 209/11; 209/127.2; 209/127.4
[58] Field of Search .......... 209/3, 10, 11, 12, 30, 209/127.1, 127.2, 127.4, 128–131

[56] References Cited

U.S. PATENT DOCUMENTS

| | | | |
|---|---|---|---|
| 4,379,748 | 4/1983 | Hoogendoorn | 209/11 |
| 4,570,861 | 2/1986 | Zentgraf et al. | 209/127.1 X |
| 4,797,201 | 1/1989 | Küppers et al. | 209/129 X |
| 4,809,854 | 3/1989 | Tomaszek | 209/3 |
| 5,115,987 | 5/1992 | Mithal | 209/11 X |
| 5,118,407 | 6/1992 | Beck et al. | 209/127.2 X |
| 5,234,110 | 8/1993 | Kobler | 209/11 X |
| 5,268,074 | 12/1993 | Brooks et al. | 209/3 X |

FOREIGN PATENT DOCUMENTS

| | | |
|---|---|---|
| 3035649A1 | 4/1982 | Germany . |
| 3227874A1 | 1/1984 | Germany . |
| 1107574 | 5/1965 | United Kingdom . |

Primary Examiner—David H. Bollinger
Attorney, Agent, or Firm—Collard & Roe

[57] ABSTRACT

Plastic mixtures, in particular those of a smilar density such as polyethylene terephthalate and polyvinyl chloride, are separated electrostatically, whereby the mixture, for triboelectric charging, is subjected to a thermal treatment.

10 Claims, 1 Drawing Sheet

METHOD OF SEPARATING POLY(ETHYLENE TEREPHTHALATE) (PET) AND POLY(VINYL CHLORIDE) (PVC)

The invention relates to a process for the separation of plastic particles of a plastic mixture of plastics of a chemically different type which, however, are in a density range overlapping itself, such as, for example, polyethylene terephthalate (PET) and polyvinyl chloride (PVC), by an electrostatic separation process by means of a free-fall separator.

Enormous quantities of mixed plastic wastes are collected in many countries. A known example thereof are used one-way plastic beverage bottles. Said bottles consist of PVC or PET. In addition, the bottles have, as a rule, a polyethylene screw cap, and the PET-bottles are provided with a bottom part made of polyethylene (PE). A mixed plastic waste consisting of PET, PVC and PE is collected in the collection of such bottles.

Direct recycling of the mixed bottle plastics is not possible because PET melts only at 260° C., whereas PVC decomposes already above the softening temperature of 160° C., and PE already at 105° to 135° C.

There are, therefore, no appreciable possibilities for recycling such mixed plastics, so that heretofore, the waste plastics have not been collected in most cases but eliminated via the household refuse, i.e., they are finally incinerated or deposited in dumps.

Due to the fact that the dumping space becomes scarce and because of the resistance of the population against the set-up of new refuse incineration plants, said type of elimination will be highly restricted in the future by government regulations on recycling, among other things.

Furthermore, as a rule, no profits can be achieved for mixed PVC-containing plastics; the fact is rather that the reuser frequently demands a credit oriented on the dumping cost saved.

As opposed to the above, there is since a long time a demand for sorted recycling plastics, whereby the prices for this are in line with the prices for the new materials. For recycling goods, up to 60% of the value of the new materials is achieved depending on the quality. There is, therefore, much interest in processes for the separation of PVC-containing mixed plastics. The use of hydrocyclones is already known for the separation of plastics of different density. However, said process fails if the plastics to be separated are in the same density range, as intended in the present case.

Furthermore, a process has become known which exploits the different melting points of the plastics of a mixture for the separation. The plastic mixture is ground and heated, whereby the PVC particles melting first adhere to a rotating roll and are removed from the mixture. Since the process of melting out takes place very slowly, said process is suitable only for low through-puts and, therefore, out of the question for application on a large technical scale.

Furthermore, a process operating with an X-ray detector has become known. According to said process, the PVC-bottles are identified spectroscopically and sorted mechanically.

Such plants have a low through-put. The process is limited to whole bottles.

A process of the type specified at the beginning is known from DE-PS 30 35 649.

In this connection, the plastic mixture is brought to a uniform particle size of 3 to 7 mm, then charged triboelectrically, and admitted into a free-fall separator, where an electrostatic field of 3 to 5 KV/cm is maintained between its electrodes.

In this connection, a portion of the material is deposited in accordance with the charge on the respective electrode, whereas another portion of the mixture falls as so-called medium material through the free-fall separator because it is not attracted by any electrode due to insufficient electrostatic charge. Furthermore, plastics of the same density have heretofore not been accessible to electrostatic separation.

It is disadvantageous with the known process that considerable amounts of medium material are collected.

Now, it has been found that an increase in the degree of separation can be achieved, or an effective separation is made possible at all with certain plastic mixtures by subjecting the plastic mixture prior to the triboelectric charging to a temperature treatment at 70° to 100° C. over a time period of at least 5 minutes.

In this way, a drying of the mixture takes place simultaneously if the plastic mixture should have a residual proportion of water. The separation of plastics of the same or very similar density is now possible as well.

It is assumed that through said thermal treatment, a change is effected in the surface of the plastic that permits a superior electrostatic charging.

Advantageously, the subsequent triboelectric charging of the plastic mixture takes place at a temperature of 15° to 50° C., preferably at 20° to 35° C. in a relative humidity of the ambient air of 10 to 40%, preferably 15 to 20%. For a plastic mixture conditioned under said conditions it also suffices if a field intensity of 2 to 3 KV/cm is maintained in the free-fall separator.

The danger of so-called spray discharges is reduced with such low field intensities; the spray discharges can effect an ignition of the plastic particles, or a dust explosion.

Advantageously, the plastic mixture has a particle size of under 10 mm, preferably of under 6 mm, whereby the plastic mixture, which, for example, consists of cut one-way bottles, is cleaned prior to the thermal treatment from substances such as, for example, paper or beverage residues by slurrying in water. The cleaning takes place, for example in a washing mill, or with the help of a turbo-washer, whereby several cleaning operations may be required depending on the degree of contamination. The dehydration of said washed and thus wet mixture takes place by a dehydration device such as, for example, a centrifuge, to a residual water proportion of about 2%. After the thermal treatment, the plastic mixture can be admitted for the triboelectric charging into a fluidized-bed dryer.

In addition, for superior triboelectric charging, the dry plastic mixture can also be passed through a spiral worm, or pneumatically conveyed.

If the quantity of medium material obtained by onetime separation should still be too high, the quantity of medium material can, of course, pass through the process again, whereby another washing operation is normally not required.

For further separation, the preconcentrates can be admitted to another after-connected free-fall separator, whereby the medium material is first triboelectrically charged again in a second fluidized-bed dryer.

The residual fraction can be admitted to the first fluidized-bed dryer, whereby—if it is mixed with moist material—the falsely charged plastic particles are discharged prior to the new charging, which has a positive effect on obtaining a high yield with respect to the subsequent separation in the free-fall separator.

The following example with the representation of the process in a flow diagram serves for explaining the process according to the invention.

EXAMPLE

A beverage bottle mixture had the following composition without taking into account the beverage residue:
19.8% PVC
76.9% PET
2.1% PE
1.2% Paper By way of a metering device, the bottle mixture was continuously fed into a wet-operating cutting mill and cut up under addition of water to a particle size of about 6 mm. The dirt solution containing also paper was drawn off.

Subsequently, the material was vigorously stirred in a washer and transferred to a friction separator, and the residual contaminants present in the plastic such as paper, sand and other contaminants were separated.

The mixture of plastic shreds was again picked up with water and admitted into a hydrocyclone for the separation of the polyolefins. The resulting PVC-PET-mixture was separated from the liquid on a vibration screen, centrifuged, and heat-treated and dried for 6 minutes in a fluidized-bed dryer at 70° to 100° C.

In the fluidized bed, last paper residues that may still be present can be removed with the exhaust air and separated from the exhaust air by means of a cyclone. The predried material was subsequently contacted in another fluidized-bed dryer for 3 minutes at 30° C. and at the same time charged.

The material draining from the fluidized bed was continuously admitted into a separation plant comprised of two free-fall separators. The PVC-concentrate obtained in the first separation stage was conveyed by means of a spiral screw to the second free-fall separator, whereby a selective charging of the plastic particles developed again.

The plastic mixture so charged was separated in the after-separation separator into a high-percent PVC-concentrate, a medium-material fraction and a deconcentration fraction containing about 53% PET. The latter, together with the medium material of the first separation stage, was recycled into the fluidized bed for new charging.

All in all, it was possible to separate the bottle mixture into
a PVC-fraction with 99.3% PVC-content,
a PET-fraction with 99.4% PET-content, and
a PE-fraction with 97.6% PE-content.

The degree of purity thus far exceeds 95%, so that it is possible to speak of substantially purely sorted mixtures, whose recycling is possible without problems.

The yield (absolute quantity) amounts to:
96.2% PVC
94.6% PET
89.7 % PE.

Flow diagram relating to the example:

Separation of the Plastics of a Mixture of Empty Beverage Bottles - 100 kg 19.8% PVC
76.9% PET
2.1% PE
1.2 % Paper.

We claim:

1. Process for the separation of plastic particles of a plastic mixture of plastics of a chemically different type which, however, are in an overlapping density range, whereby the plastic mixture has a particle size of under 10 mm, comprising the steps of
   subjecting the plastic mixture prior to a triboelectric charge to a thermal treatment at 70° to 100° C. over a time period of at least five minutes;
   maintaining a temperature of the plastic mixture during triboelectric charging at 15° C. to 50° C. in a relative humidity of the ambient air of 10 to 40%; and
   electrostatic separating the plastic mixture by means of a free-fall separator.

2. Process according to claim 1, further comprising the step of
   cleaning the plastic mixture of foreign substances prior to the thermal treatment.

3. Process according to claim 1, further comprising the step of
   dehydrating the mixture of a dehydration centrifuge to a residual water proportion of under 2%.

4. Process according to claim 1, further comprising the step of
   admitting the plastic into a fluidized-bed dryer for the triboelectric charging.

5. Process according to claim 1, further comprising the step of
   passing the plastic mixture through a spiral worm.

6. Process according to claim 1, further comprising the step of
   pneumatically conveying the plastic mixture.

7. Process according to claim 1,
   wherein the plastics comprises a mixture of polyethylene terephthalate and polyvinyl chloride.

8. Process for the separation of plastic particles of a plastic mixture of plastics of a chemically different type which, however, are in an overlapping density range comprising the steps of
   subjecting the plastic mixture to a thermal treatment at least 70° to 100° C. over a time period of at least 5 minutes prior to a triboelectric charging;
   triboelectric charging the plastic mixture;
   electrostatic separating the plastic mixture by means of a free-fall separator;
   cleaning the plastic mixture of foreign substances prior to the thermal treatment; and
   dehydrating the mixture by a dehydration device centrifuge to a residual water proportion of 2%.

9. Process for the separation of plastic particles of a plastic mixture of plastics of a chemically different type which, however, are in an overlapping density range comprising:
   subjecting the plastic mixture to a thermal treatment at least 70° to 100° C. over a time period of at least 5 minutes prior to a triboelectric charging;
   triboelectric charging the plastic mixture;
   electrostatic separating the plastic mixture by means of a free-fall separator; and
   passing the plastic mixture through a spiral worm.

10. Process for the separation of plastic particles of a plastic mixture of plastics of a chemically different type which, however, are in an overlapping density range comprising:
    subjecting the plastic mixture to a thermal treatment at least 70° to 100° C. over a time period of at least 5 minutes prior to a triboelectric charging;
    triboelectric charging the plastic mixture;
    electrostatic separating the plastic mixture by means of a free-fall separator; and
    pneumatically conveying the plastic mixture.

* * * * *